United States Patent
Patel et al.

(10) Patent No.: US 6,638,677 B2
(45) Date of Patent: Oct. 28, 2003

(54) TONER PROCESSES

(75) Inventors: Raj D. Patel, Oakville (CA); Valerie M. Farrugia, Mississauga (CA); Daryl Vanbesien, Woodbridge (CA); Edward G. Zwartz, Mississauga (CA)

(73) Assignee: Xerox Corporation, Stamford, CT (US)

( * ) Notice: Subject to any disclaimer, the term of this patent is extended or adjusted under 35 U.S.C. 154(b) by 1 day.

(21) Appl. No.: 10/086,063

(22) Filed: Mar. 1, 2002

(65) Prior Publication Data

US 2003/0165767 A1 Sep. 4, 2003

(51) Int. Cl.$^7$ ............................................... G03G 9/087
(52) U.S. Cl. .................................. 430/137.14; 523/335
(58) Field of Search ...................... 430/137.14; 523/335

(56) References Cited

U.S. PATENT DOCUMENTS

| | | | | |
|---|---|---|---|---|
| 4,558,108 A | 12/1985 | Alexandru et al. | .......... | 526/340 |
| 4,797,339 A | 1/1989 | Maruyama et al. | .......... | 430/109 |
| 4,983,488 A | 1/1991 | Tan et al. | .......... | 430/137 |
| 4,996,127 A | 2/1991 | Hasegawa et al. | .......... | 430/109 |
| 5,278,020 A | 1/1994 | Grushkin et al. | .......... | 430/137 |
| 5,290,654 A | 3/1994 | Sacripante et al. | .......... | 430/137 |
| 5,308,734 A | 5/1994 | Sacripante et al. | .......... | 430/137 |
| 5,344,738 A | 9/1994 | Kmiecik-Lawrynowicz et al. | .......... | 430/137 |
| 5,370,963 A | 12/1994 | Patel et al. | .......... | 430/137 |
| 5,403,693 A | 4/1995 | Patel et al. | .......... | 430/137 |
| 5,858,601 A | 1/1999 | Ong et al. | .......... | 435/137 |
| 5,945,245 A | 8/1999 | Mychajlowskij et al. | .......... | 430/137 |
| 5,977,210 A | 11/1999 | Patel et al. | .......... | 523/161 |
| 6,140,003 A | 10/2000 | Sacripante et al. | .......... | 430/110 |
| 6,268,103 B1 * | 7/2001 | Hopper et al. | .......... | 430/137.14 |
| 6,395,445 B1 * | 5/2002 | Toth et al. | .......... | 430/137.14 |

OTHER PUBLICATIONS

Copending Application Ser. No. 09/877,747, filed Jun. 11, 2001, on "Toner Coagulant Processes" by Lu Jiang et al.
Copending Application Ser. No. 09/922,263, filed Aug. 16, 2001, on "Toner Coagulant Processes" by Raj D. Patel et al.
Copending Application Ser. No. 09/810,138, filed Mar. 19, 2001 on "Toner Coagulant Processes" by Michael A. Hopper et al.
Copending Application Ser. No. 09/960,425, filed Sep. 24, 2001 on "Toner Processes" by Daryl Vanbesien et al.
Copending Application Ser. No. 09/976,943, filed Oct. 15, 2001 on "Toner Coagulant Processes" by Daryl Vanbesien et al.

* cited by examiner

Primary Examiner—Mark A. Chapman
(74) Attorney, Agent, or Firm—E. O. Palazzo

(57) ABSTRACT

A process comprising heating a latex, a colorant dispersion, a polytetrafluoroethylene dispersion, and an organo metallic complexing component.

28 Claims, No Drawings

TONER PROCESSES

CROSS REFERENCES

Illustrated in applications and patents U.S. Pat. No. 6,495,302, filed Jun. 11, 2001 on Toner Coagulant Processes; U.S. Pat. No. 6,416,920, filed Mar. 19, 2001 on Toner Coagulant Processes; U.S. Pat. No. 6,500,597, filed Aug. 6, 2001 on Toner Coagulant Processes; U.S. Pat. No. 6,562,541, filed Sep. 24, 2001 on Toner Processes; U.S. Pat. No. 6,576,389, filed Oct. 15, 2001 on Toner Coagulant Processes; and U.S. Ser. No. 10,106,500, filed January 2002 on Toner Coagulant Processes, the disclosures of which are totally incorporated herein by reference, are toner processes wherein a coagulant may be selected.

Illustrated in U.S. Pat. No. 5,945,245, the disclosure of which is totally incorporated herein by reference, is a process for the preparation of toner compositions comprising (i) preparing an emulsion latex comprised of sodio sulfonated polyester resin particles of from about 5 to about 500 nanometers in size diameter by heating the resin in water at a temperature of from about 65° C. to about 90° C.;

(ii) preparing a pigment dispersion by dispersing in water from;about 10 to about 25 weight percent of sodio sulfonated polyester and from about 1 to about 5 weight percent of pigment;

(iii) adding with shearing the pigment dispersion to the latex mixture comprised of sulfonated polyester resin particles in water, followed by the addition of an alkali halide in water until aggregation results as indicated by an increase in the latex viscosity of from about 2 centipoise to about 100 centipoise;

(iv) heating the resulting mixture at a temperature of from about 45° C. to about 55° C. thereby causing further aggregation and enabling coalescence, resulting in toner particles of from about 4 to about 9 microns in volume average diameter and with a geometric distribution of less than about 1.3; and optionally (v) cooling the product mixture to about 25° C., followed by washing and drying.

The process of the above patent may be disadvantageous in that, for example, the use of an alkali metal can result in a final toner resin which evidences some crosslinking or elastic reinforcement, primarily since the metal salt functions as a crosslinked site between the sulfonate groups contained on the polyester resin causing an increase in viscosity and a decrease, or loss of high gloss characteristics for the resin. These and other disadvantages and problems are minimized, or avoided with the processes of the present invention in embodiments thereof.

The appropriate components of each of the above copending applications and patent may be selected for the present invention in embodiments thereof.

BACKGROUND OF THE INVENTION

The present invention is generally directed to toner processes, and more specifically, to aggregation and coalescence processes for the preparation of toner compositions. In embodiments, the present invention is directed to the economical chemical in situ preparation of toners without the utilization of the known pulverization and/or classification methods, and wherein in embodiments toner compositions with a volume average diameter of from about 1 to about 25, and more specifically, from about 1 to about 10 microns and narrow GSD of, for example, from about 1.14 to about 1.25 each as measured on the Coulter Counter can be obtained. The resulting toners can be selected for known electrophotographic imaging, digital, printing processes, including color processes, and lithography.

In reprographic technologies, such as xerographic and ionographic devices, toners with volume average diameter particle sizes of from about 9 microns to about 20-microns are effectively utilized. Moreover, in xerographic technologies, such as the high volume Xerox Corporation 5090 copier-duplicator, high resolution characteristics and low image noise are highly desired, and can be attained utilizing the small sized toners of the present invention with, for example, a volume average particle diameter of from about 2 to about 11 microns, and more specifically, less than about 7 microns, and with a narrow geometric size distribution (GSD) of from about 1.16 to about 1.3. Additionally, in xerographic systems wherein process color is utilized, such as pictorial color applications, small particle size colored toners, more specifically of from about 3 to about 9 microns, are desired to avoid paper curling. Also, it is preferable to select small toner particle sizes, such as from about 1 to about 7 microns, and with higher colorant loading, such as from about 5 to about 12 percent by weight of toner, such that the mass of toner layers deposited onto paper is reduced to obtain the same image quality and resulting in a thinner plastic toner layer on paper after fusing, thereby minimizing or avoiding paper curling. Toners prepared in accordance with the present invention enable in embodiments the use of lower image fusing temperatures, such as from about 120° C. to about 160° C., thereby avoiding or minimizing paper curl. Lower fusing temperatures minimize the loss of moisture from paper, thereby reducing or eliminating paper curl. The use of PTFE as a copolymer together with the polyester resin reduces the gloss of the image by about 12 to about 40 gloss units, thereby generating a matte finish image. Furthermore, by altering the amounts of PTFE, the gloss of the toner image can be matched to the paper.

For example, when a low gloss image of, more specifically, from about 1 to about 30 gloss is desired, low gloss paper is utilized, such as from about 1 to about 30 gloss units as measured by the Gardner Gloss metering unit, and which after image formation with small particle size toners, more specifically of from about 3 to about 5 microns, and fixing thereafter, results in a low gloss toner image of from about 1 to about 30 gloss units as measured by the Gardner Gloss metering unit. Alternatively, when higher image gloss is desired, such as from about 30 to about 60 gloss units as measured by the Gardner Gloss metering unit, higher gloss paper is utilized, such as from about 30 to about 60 gloss units, and which after image formation with small particle size toners of the present invention of, more specifically, from about 3 to about 5 microns, and fixing thereafter results in a higher gloss toner image of from about 30 to about 60 gloss units as measured by the Gardner Gloss metering unit. The aforementioned toner to paper matching can be attained with, for example, small particle size toners, such as less than about 7 microns, and more specifically, less than about 5 microns, such as from about 1 to about 4 microns, whereby the pile height of the toner layer or layers is considered low and acceptable.

PRIOR ART

Numerous processes are known for the preparation of toners, wherein a resin is melt kneaded or extruded with a pigment, micronized and pulverized to provide toner particles with a volume average particle diameter of from about 9 microns to about 20 microns and with broad geometric size distribution of from about 1.26 to about 1.5. In these processes, it is usually necessary to subject the aforementioned toners to classification such that the geometric size distribution of from about 1.2 to about 1.4 is attained. Also, in the aforementioned conventional. process, low toner yields after classifications may be obtained. Generally, during the preparation of toners with average particle size diameters of from about 11 microns to about 15 microns, toner yields are from about 70 percent to about 85 percent after classification. Additionally, during the preparation of smaller sized toners with particle sizes of from about 7 microns to about 11 microns, lower toner yields may be obtained after classification, such as from about 50 percent to about 70 percent. With the processes of the present invention in embodiments, small average particle sizes of, for example, from about 3 microns to about 15 microns, and more specifically, about 5 microns are attained without resorting to classification processes, and wherein narrow geometric size distributions are attained, such as from about 1.16 to about 1.30, and more specifically from about 1.16 to about 1.25. High toner yields are also attained such as from about 90 percent to about 98 percent in embodiments of the present invention. In addition, by the toner particle preparation process of the present invention in embodiments, small particle size toners of from about 3 microns to about 7 microns can be economically prepared in high yields, such as from about 90 percent to about 98 percent by weight based on the weight of all the toner ingredients, such as toner resin and colorant.

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. The disadvantage, for example, of poor GSD requires classification resulting in low toner yields, reference for example U.S. Pat. No. 4,797,339, wherein there is disclosed a process for the preparation of toners by resin emulsion polymerization, wherein similar to the '127 patent certain polar resins are selected, and wherein flocculation as in the present invention is not believed to be disclosed; and U.S. Pat. No. 4,558,108, wherein there is disclosed a process for the preparation of a copolymer of styrene and butadiene by specific suspension polymerization.

In U.S. Pat. No. 5,290,654, the disclosure of which is totally incorporated herein by reference, there is illustrated a process for the preparation of toners comprised of dispersing a polymer solution comprised of an organic solvent and a polyester, and homogenizing and heating the mixture to remove the solvent and thereby form toner composites.

Emulsion/aggregation/coalescing processes for the preparation of toners are illustrated in a number of Xerox patents, the disclosures of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797. Also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,910,387; 5,919,595; 5,916,725; 5,902,710; 5,863,698, 5,925,488; 5,977,210 and 5,858,601. In embodiments of the present invention, the appropriate components and process parameters of the above Xerox patents may be selected.

SUMMARY OF THE INVENTION

It is a feature of the present invention to provide toner processes with many of the advantages illustrated herein.

In another feature of the present invention there are provided simple and economical processes for the preparation of black and colored toner compositions with, for example, excellent colorant dispersions and narrow GSD.

In another feature of the present invention there are provided simple and economical in situ surfactant free processes for black and colored toner compositions by an emulsion aggregation process, and wherein a sulfonated polyester is selected as the resin, reference U.S. Pat. No. 6,140,003, the disclosure of which is totally incorporated herein by reference.

In a further feature of the present invention there are provided processes for the preparation of toners containing a sulfonated polyester and PTFE with a toner average particle volume diameter of from between about 1 to about 20 microns, and more specifically, from about 1 to about 7 microns in volume average diameter, and with a narrow GSD of from about 1.13 to about 1.35, and more specifically, from about 1.14 to about 1.22 as measured by a Coulter Counter.

In a further feature of the present invention there are provided processes for the preparation of toner compositions with certain effective particle sizes by controlling the temperature of the aggregation/coalescence, which process comprises stirring and heating at a suitable aggregation/coalescence temperature.

Another further feature of the present invention provides a process for the preparation of toners with particle size distribution which can be improved from 1.4 to about 1.16 as measured by the Coulter Counter by, for example, increasing the temperature of aggregation/coalescence from about 25° C. to about 60° C., and more specifically, from about 45° C. to about 55° C., and wherein the toners possess a low gloss, a low minimum fix temperature, and a high offset temperature (HOT), which toners may also possess a smooth surface.

These and other features of the present invention are accomplished in embodiments by the provision of toners and processes thereof. In embodiments of the present invention, there are provided processes for the economical direct preparation of toner compositions by flocculation or heterocoagulation, and coalescence.

Aspects of the present invention relate in embodiments thereof to a process comprising heating a latex, a colorant dispersion a polytetrafluoroethylene dispersion, and an organo metallic complexing component; a process wherein the latex contains a sulfonated polyester, and wherein the heating is below about the glass transition temperature of the polyester, followed by heating above about the glass transition temperature. of the polyester; a toner process wherein the polyester is a sodio sulfonated polyester; a process wherein the latex which contains a sulfonated polyester and water is generated by heating, subsequently adding thereto a colorant dispersion and a polytetrafluoroethylene dispersion, followed by the addition of an organo metallic complexing component, and thereafter heating, and wherein there results a toner product; a process wherein the latex is (i) comprised of sodio sulfonated polyester resin particles of a size diameter of from about 5 to about 300 nanometers, which resin particles are present in an amount of, for example, from about 5 to about 40 weight percent, and wherein the latex is prepared by heating the resin particles in water at a temperature of from about 45° C. to about 80° C.;

(ii) thereafter adding the colorant dispersion containing from about 20 to about 50 percent of a predispersed colorant in water, and wherein the mean colorant diameter size is from about 50 to about 150 nanometers, followed by adding the polytetrafluoroethylene (PTFE) dispersion containing from about 20 to about 50 percent of a predispersed polytetrafluoroethylene copolymer in water with a mean particle size for the copolymer of from about 30 to about 150 nanometers and shearing, followed by the addition of the organo metallic complexing component in an amount of from about 1 to about 10 weight percent in water;

(iii) heating the resulting mixture at a temperature of from about 35° C. to about 65° C. thereby causing aggregation and coalescence resulting in toner particles of from about 3 to about 20 microns in diameter; and (iv) subsequent to cooling isolating a toner product; a process wherein the organo metallic complexing component is, for example, selected from the group consisting of metal salts of acetate where the metal is zinc, lithium, calcium, barium, copper(II), chromium(II), strontium, vanadium, manganese(II), iron(II), silver or sodium; the salt derivatives of 2,4-pentanedione of zinc acetylacetonate hydrate, lithium acetylacetonate, calcium acetylacetonate hydrate, barium acetylacetonate hydrate, copper (II) acetylacetonate, chromium(II) acetylacetonate, strontium acetylacetonate, vanadium(III) acetylacetonate, manganese(II and II) acetylacetonate, iron(II) acetylacetonate, silver acetylacetonate or sodium acetylacetonate; metal salts of benzoate where the metal is lithium, silver or sodium, and a metal formate wherein the metal is copper(II) or sodium; a process wherein the organo metallic complex is selected in an amount of from about 1 to about 10 weight percent by weight based on the weight of the resin and the colorant; a process wherein the polytetrafluoroethylene, is a copolymer of a size diameter of about 30 to about 150 nanometers; a process wherein the polytetrafluoroethylene is generated from the reaction of tetrafluoroethylene, hexafluoropropylene and vinylidene fluoride; a process wherein the polytetrafluoroethylene is generated from the reaction of tetrafluoroethylene, hexafluoropropylene and vinylidene fluoride in an amount of from about 30 to about 70 weight percent of tetrafluoroethylene, about 10 to about 30 weight percent of hexafluoropropylene and about 10 to about 50 weight percent of vinylidene fluoride, and wherein the total of said three components is about 100 percent; a process wherein the polytetrafluoroethylene is selected in an amount of from about 1 to about 20 percent by weight; a process wherein the particle size distribution of the aggregated particles is about 1.40 decreasing to about 1.15, when the temperature is increased from room temperature, about 25° C. to about 55° C.; a process wherein the shearing is accomplished by homogenizing at from about 1,000 revolutions per minute to about 10,000 revolutions per minute, at a temperature of from about 25° C. to about 35° C. for an optional duration of from about 1 minute to about 120 minutes; a process wherein the polyester of (i) is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylene sodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate); a process wherein the colorant is carbon black, magnetite, cyan, yellow, magenta, or mixtures thereof; a process wherein there results toner particles of from about 2 to about 15 microns in volume average diameter, and the geometric size distribution thereof is from about 1.15 to about 1.35; a process wherein there is added to the surface of the formed toner metal salts, metal salts of fatty acids, silicas, metal oxides, or mixtures thereof, each in an amount of from about 0.1 to about 10 weight percent of the obtained toner; a process wherein the toner obtained after cooling is from about 3 to about 15 microns in volume average diameter, and the geometric size distribution thereof is from about 1.15 to about 1.25; a process wherein prior to cooling (iv) there is accomplished heating of from about 35° C. to about 65° C. above the polyester resin Tg; a substantially surfactant free process for the preparation of toner comprising admixing (1) an emulsion latex comprised of sodio sulfonated polyester resin particles of about 30 to about 80 nanometers in size by heating the resin in water at a temperature of from about 15° C. to about 30° C. above the resin glass transition temperature (2) with a colorant dispersion containing from about 20 to about 50 percent of predispersed colorant in water, with a mean colorant size of from about 50 to about 150 nanometers, a polytetrafluoroethylene dispersion containing from about 30 to about 50 percent of solids comprising tetrafluoroethylene, hexafluoropropylene and vinylidene fluoride in an amount of from about 30 to about 70 weight percent of tetrafluoroethylene, about 10 to about 30 weight percent of hexafluoropropylene, and about 10 to about 50 weight percent of vinylidene fluoride in water and with a mean particle size of about 50 to about 120 nanometers, followed by the addition of an organo metallic complexing agent; heating the resulting mixture at a temperature of from about 35° C. to about 65° C. thereby causing aggregation and coalescence of the latex resin, the colorant and the polytetrafluoroethylene, and (v) cooling the mixture followed by isolating the toner product; a process wherein isolation is by filtration and cooling is to about 25° C.; a surfactant free process for the preparation of toner comprising mixing an emulsion latex comprised of sodio sulfonated polyester resin particles, colorant, and polytetrafluoroethylene, followed by the addition of an organo metallic complexing agent, and heating the resulting mixture causing aggregation and enabling coalescence of the latex resin, the colorant and the polytetrafluoroethylene; a process comprising
(i) admixing an emulsion latex comprised of sodio sulfonated polyester resin particles with a colorant;
(ii) adding a polytetrafluoroethylene to the emulsion, followed by the addition of an organo metallic complexing agent;
(iii) heating the resulting mixture at a temperature of from about 35° C. to about 65° C. thereby causing aggregation and coalescence of the latex resin, the colorant and the polytetrafluoroethylene, cooling the product mixture, followed by isolation of the toner; a process wherein there is accomplished
  (i) admixing the emulsion latex comprised of a sodio sulfonated polyester resin particles of a size diameter of from about 10 to about 250 nanometers present in an amount of from about 5 to about 40 weight percent, and heating the resin particles in water at a temperature of from about 45° C. to about 80° C.;
  (ii) adding the colorant containing about 20 to about 50 percent of colorant in water, which colorant possesses a mean size diameter of from about 50 to about 150 nanometers, adding the PTFE dispersion containing about 20 to about 50 percent of predispersed PTFE copolymer in water, which PTFE possesses a mean particle size of about 30 to about 150 nanometers, to the latex mixture with shearing, followed by the addition of the organo metallic complexing agent in an amount of from about 1 to about 10 weight percent in water;
  (iii) heating the resulting mixture at a temperature of from about 45° C. to about 60° C. causing aggregation and coalescence resulting in toner particles of from about 4 to about 18 microns in size diameter; and
  (iv) cooling the toner product mixture to about 25° C., followed by filtering and drying; a process wherein the colorant is a pigment, the resin is copoly(1,2-propylene-diethylene) terephthalate-copoly(sodium sulfoisophthalate dicarboxylate), the polytetrafluoroethylene is present as a dispersion, and the complexing component is $Zn(OCOCH_3)_2 \cdot 2H_2O$; a process wherein the colorant is a pigment, the resin is copoly(1,2-propylene-diethylene) terephthalate-copoly(sodium sulfoisophthalate dicarboxylate), the polytetrafluoroethylene is present as a dispersion, and the complexing component is $Zn(OCOCH_3)_2 \cdot 2H_2O$; a process wherein said colorant is a pigment of carbon black, magenta, yellow, cyan, or mixtures thereof; a process wherein the complexing component is metal salts of acetate where the metal is zinc, lithium, calcium, barium, copper(II), chromium(II), strontium, vanadium, manganese(II), iron(II), silver or sodium; PTFE (polytetrafluoroethylene) submicron particles contained in the sodio sulfonated polyester (SPE) resin thereby providing a reduction in gloss, wherein the amounts of the PTFE in the SPE resin can control the image gloss levels achievable when the toner image is fused on paper; a process that is rapid since, for example, the aggregation/coalescence time can be reduced to from about 1 to about 3 hours by increasing the temperature from room, about 25° C., (RT) to about 50 to 60° C., and wherein the process consumes from about 1 to about 8 hours; an economical process for the preparation of toner compositions, which after fixing to paper substrates results in images with a gloss of from about 10 GGU (Gardner Gloss Units) up to about 50 GGU as measured by Gardner Gloss meter matching of toner and paper; a toner comprised of a polymeric resin, pigment, PTFE, and optional charge control agent and obtainable in high yields of from about 90 percent to about 100 percent by weight of toner without resorting to classification, and wherein less or no surfactant is used; and processes for dissipating a polar charged sodium sulfonated polyester resin in water at about 10° C. to about 25° C. above the Tg of the polyester to form an emulsion latex, followed by mixing with pigment, a PTFE dispersion and organo metallic complexing agent, and thereafter heating the mixture to from about 30° C. to about 65° C., and more specifically, from about 45° C. to about 60° C. to effect aggregation/coalescence of the emulsion particles and pigment to form coalesced toner particles of resin and pigment, which toner possesses a size of from 1 to about 10 microns, and more-specifically, from about 3 to about 7 microns; toner compositions with low fusing temperatures of from about 110° C. to about 150° C. and with excellent blocking characteristics at from about 50° C. to about 60° C.; toner processes wherein there are selected organo metallic complexing agents, such as zinc acetate, as a coagulant; a surfactant free process thereby reducing or eliminating extensive washings; toner processes wherein there is selected a high speed mixer or a shearing device, such as a polytron or an inline mixer, during the blending of the SPE emulsion, colorant dispersion, and the PTFE dispersion in the presence of a coagulating component, such as an organo metallic complexing component; processes for the preparation of toner compositions which comprises initially attaining or generating a colorant, such as a pigment dispersion, for example by dispersing an aqueous mixture of a colorant, such as carbon black like REGAL 330® obtained from Cabot Corporation, phthalocyanine, quinacridone or RHODAMINE B™, and generally cyan, magenta, yellow, or mixtures thereof, by utilizing a high shearing device, such as a Brinkmann Polytron, thereafter shearing this mixture by utilizing a high shearing device, such as a Brinkmann Polytron, a homogenizer or a high speed in line mixer, a sonicator or microfluidizer with a suspended resin mixture comprised of a sulfonated polyester polymer component, a PTFE dispersion, and adding an organo metallic complexing agent, and subsequently heating to enable aggregation/coalescence; a process for the preparation of toner compositions comprising
(i) preparing an emulsion latex comprised of sodio sulfonated polyester resin particles of from about 100 to about 300 nanometers, and more specifically, 10 to about 250 nanometers in diameter, and present in an amount of from about about 5 to about 40 weight percent by heating the resin in. water at a temperature of from about 45° C. to about 80° C.;
(ii) adding a pigment dispersion containing about 20 to about 50 percent of predispersed pigment in water with a mean pigment size of from about 50 to about 150 nanometers, and a PTFE dispersion containing about 20 to about 50 percent of pre-dispersed PTFE copolymer in water with a mean particle size of about 30 to about 150 nanometers, to a latex mixture comprised of the sulfonated polyester resin particles in water with shearing, followed by the addition of an organo metallic complexing agent of from about 1 to about 5 weight percent in water;

(iii) heating the resulting mixture at a temperature of from about 35° C. to about 65° C., and more specifically, from about 45° C. to about 60° C. thereby causing aggregation and coalescence resulting in toner particles of from about 4 to about 9 microns in size with a geometric distribution of less than about 1.3; and (iv) cooling the product mixture to about 25° C., followed by filtering and drying; a process for the preparation of toner comprising (i) preparing, or providing an emulsion latex comprised of sodio sulfonated polyester resin particles of from about 5 to about 500 nanometers, and more specifically, from about 15 to about 250 nanometers in size diameter by heating the resin in water at a temperature of from about 65° C. to about 90° C.;

(ii) adding a colorant dispersion and a PTFE dispersion to a latex mixture comprised of sulfonated polyester resin particles in water with shearing, followed by the addition of an organo metallic complexing agent, such as zinc acetate complex, in water;

(iii) heating the resulting mixture at a temperature of from about 35° C. to about 65° C., and more specifically, from about 45° C. to about 60° C. thereby causing aggregation and enabling coalescence, resulting in toner particles of from about 4 to about 12 microns in volume average diameter and with a geometric distribution of about 1.3; and optionally (iv) cooling the product mixture to about 25° C., followed by filtering and drying; a surfactant free process for the preparation of toner compositions comprising (i) preparing an emulsion latex comprised of sodio sulfonated polyester resin particles of less than 0.1 micron in size by heating the resin in water at a temperature of from about 5° C. to about 30° C., and more specifically, from about 10C to about 20° C. above the resin transition temperature;

(ii) adding a colorant dispersion and a PTFE dispersion to the latex mixture comprised of sulfonated polyester resin particles in water with shearing, followed by the addition of an organo metallic complexing component of from about 1 to about 7 weight percent in water;

(iv) heating the resulting mixture at a temperature of from about 35° C. to about 65° C., and more specifically, from about 45° C. to about 60° C. thereby causing aggregation and coalescence to result in toner particles of from about 4 to about 10 microns in size; and (v) cooling the product mixture to about 25° C., followed by filtering and drying; a process for the preparation of toner compositions comprising (i) preparing an emulsion latex comprised of sodio sulfonated polyester resin particles by heating the resin in water;

(ii) adding a pigment dispersion and a PTFE dispersion to a latex mixture comprised of sulfonated polyester resin particles in water with shearing, followed by the addition of an organo metallic complexing agent; and (iii) heating the resulting mixture thereby causing aggregation and enabling coalescence wherein said dispersions contain water; and a surfactant free process comprised of forming a latex of a polyester, such as a sodium sulfonated polyester resin in water, mixing the latex and a polytetrafluoroethylene (PTFE) with a colorant, dispersion containing a coagulating organo metallic complexing agent, and thereafter, heating the resulting mixture to primarily enable the generation of toner aggregates and coalesced toner particles.

The resin, such as the polyester resin selected for the emulsion, specifically contains sulfonated groups thereby rendering them dissipatable, that is, they form spontaneous emulsions in water without the use of organic solvents, above the glass transition temperature, Tg, of the polyester resin. The process of the present invention can be considered a substantially surfactant free chemical method wherein sulfopolyester particles are aggregated and coalesced with organo metallic complexing agents in the presence of a colorant dispersion and a PTFE dispersion by heating wherein during the heating no surfactants are utilized. Heating the mixture at temperatures of from about 45° C. to about 55° C. generates toner size particles with, for example, an average particle volume diameter of from about 1 to about 25, and more specifically, about 2 to about 10 microns. It is believed that during heating the components of the sulfonated polyester latex, the colorant and the PTFE dispersion aggregate in the presence of the organo metallic complexing agent and fuse together to form composite toner particles. Thus, in embodiments thereof, the present invention is directed to an in situ process comprised of first dispersing a colorant like a pigment, such as HELIOGEN BLUE™ or HOSTAPERM PINK™, reference the Color Index, in an aqueous mixture utilizing a high shearing device, such as a Brinkmann Polytron, microfluidizer or sonicator, thereafter shearing this mixture with a latex of suspended polyester particles, and which particles are, for example, of a size of from about 5 to about 500, and more specifically, about 10 to about 250 nanometers in volume average diameter, and a PTFE dispersion of submicron particles of about 30 to about 150 nanometers as measured by the Brookhaven nanosizer. Thereafter, the aforementioned mixture is contacted with an organo metallic complexing agent, and heated with stirring for a suitable time period of, for example, from about 1 to about 8 hours, and which heating is, for example, from about 40° C. to about 60° C., and more specifically, from about 45° C. to about 55° C., thereby resulting in the aggregation and simultaneous coalescence of the resin particles with the colorant and PTFE, and permitting the formation of particles in a size of from about 0.5 micron to about 20 microns, and more specifically, from 2 to about 10 microns in average diameter size as measured by the Coulter Counter (Microsizer II). The size of the coalesced particles and their distribution can be controlled by, for example, the amount of organo metallic complexing agent and by the temperature of heating, and wherein the speed at which toner size particles are formed can also be controlled by the quantity of organo complexing agent used and by the temperature. The particles obtained after heating can be subjected to washing with, for example, water to remove residual complexing agent and drying whereby toner particles comprised of resin and colorant, especially pigment, and which toner can be of various particle size diameters, such as from 1 to about 20, and more specifically, about 12 microns in volume average particle diameter. The aforementioned toners are especially useful for the development of colored images with excellent line and solid resolution, and wherein substantially no background deposits are present.

In some instances, colorants, such as pigments available in the wet cake form or concentrated form containing water, can be dispersed utilizing a homogenizer or stirring. In other embodiments, pigments are available in a dry form, whereby dispersion in water is more specifically effected by microfluidizing using, for example, a M-110 microfluidizer and passing the pigment dispersion from 1 to 10 times through the chamber of the microfluidizer, or by sonication, such as using a Branson 700 sonicator.

One preferred resin is a sulfonated polyester, examples of which include those of U.S. Pat. No. 5,660,965, the disclosure of which is totally incorporated herein by reference, sodio sulfonated polyester, and more specifically a polyester, such as poly(1,2-propylene-sodio 5-sulfoisophthalate), poly (neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylene-sodio 5-sulfoisophthalate)-copoly-(1,2-propylene-diethylene-terephthalate-phthalate), copoly-(ethylene-neopentylene-sodio 5-sulfoisophthalate)-copoly-(ethylene-neopentylene-terephthalate-phthalate), and copoly-(propoxylated bisphenol A)-copoly-(propoxylated bisphenol A-sodio 5-sulfoisophthalate). The sulfonated polyesters may in embodiments be represented by

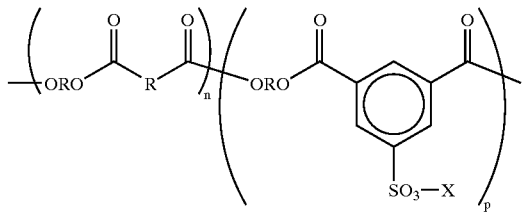

wherein R is an alkylene with, for example, from about 2 to about 25 carbon atoms, such as ethylene, propylene, butylene, or oxyalkylene diethyleneoxide, and the like; R' is an arylene with, for example, from about 6 to about 36 carbon atoms, such as a benzylene, bisphenylene, bis (alkyloxy) bisphenolene, and the like; n and p represent the number of repeating segments; and X is an alkali metal. The alkali sulfopolyester possesses, for example, a number average molecular weight ($M_n$) of from about 1,500 to about 50,000 grams per mole, a weight average molecular weight ($M_w$) of from about 6,000 grams per mole to about 150,000 grams per mole each as measured by gel permeation chromatography and using polystyrene as standards.

Various known colorants present in the toner in an effective amount of, for example, from about 1 to about 25 percent by weight of the toner, and more specifically in an amount of from about 1 to about 15 weight percent, that can be selected include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE $_1$™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra(octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4'-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, especially pigments selected, are present in various effective amounts, such as from about 1 weight percent to about 65 weight and more specifically from about 2 to about 12 percent, of the toner. Colorants include dyes, pigments, mixtures thereof, mixtures of pigments, mixtures of dyes, and the like.

The toner may also include known charge additives in effective amounts of, for example, from 0.1 to 5 weight percent, such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Examples of organometallic complexing agents, or components include diamine, alkylidene, carboxylic acid, acyl and carbonyl ligands. Specific examples of complexing agents include metal salts of acetate where the metals may be zinc, lithium, calcium, barium, copper(II), chromium(II), strontium, vanadium, manganese(II), iron(II), silver or sodium; salts of 2,4-pentanedione, more specifically zinc acetylacetonate hydrate, lithium acetylacetonate, calcium acetylacetonate hydrate, barium acetylacetonate hydrate, copper(II) acetylacetonate, chromium(II) acetylacetonate, strontium acetylacetonate, vanadium(III) acetylacetonate, manganese(II or III) acetylacetonate; iron(III) acetylacetonate, silver acetylacetonate and sodium acetylacetonate; metal salts of benzoate where the metals may be lithium, silver or sodium and metal salts of formate where the metals may be copper(II) or sodium. Other examples include zinc 3,5-di-tert-butylsalicylate, zinc diethyldithiocarbamate, N-lithioethylenediamine and calcium propionate. An effective concentration of the complexing agent is in embodiments, for example, from about 0.5 to about 10 percent by weight of toner, and more specifically, from about 1 to about 5 percent by weight of toner.

Examples of polytetrafluoroethylenes include, for example, colloidal polytetrafluoroethylene copolymers, such as copolymers of tetrafluoroethylene, hexafluoropropylene, and vinylidene fluoride wherein the polytetrafluoroethylene selected possesses, for example, a melt viscosity of about $10^2$ to about $10^6$ poise (P) at a temperature of about 372° C. wherein the melt viscosity is calculated from the melt flow rate (MFR) by Hagen-Poiseuille's law to obtain an indication of the molecular weight, and which molecular weight can increase with increasing melt viscosity or decreasing MFR. The polytetrafluoroethylene melting point can be varied by varying the ratio of each monomer component selected, and wherein colloidal refers, for example, to particles with a size diameter of from about 70 to about 200 nanometers, and more specifically, about 80 nanometers to about 120 nanometers, and which polytetrafluoroethylenes are available from 3M. PTFE copolymers selected include PTFE copolymers having a specific surface area BET of about 2 to about 18 $m^2/g$ as measured by test DIN 66131. Monomer components selected have ratios wherein there is present about 30 weight percent to about 70 weight percent tetrafluoroethylene, about 10 weight percent to about 30 weight percent hexafluoropropylene, and about 10 weight percent to about 50 weight percent vinylidene fluoride, providing melting points between about 115° C. to about 180° C. Other fluorinated polymer blends include copolymers of tetrafluoroethylene and perfluorovinylether with a melting point of about 310° C., an alternating copolymer of tetrafluoroethylene and ethylene with a melting point of 260° C., and a copolymer of tetrafluoroethylene and hexafluoropropylene with a melting point of 260° C. Fluorinated colloidal particles can also be obtained from such companies as E.I. DuPont and Gore Associates.

Surface additives that can be added to the toner compositions after washing or drying include, for example, metal salts, metal salts of fatty acids, colloidal silicas, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R9720 available from Degussa in amounts of from 0.1 to 2 percent, which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. Imaging methods are also envisioned with the toners and developers of the present invention, reference for example a number of the patents mentioned herein, and U.S. Pat. No. 4,265,660, the disclosure of which is totally incorporated herein by reference.

The following Examples are being submitted to further define various species of the present invention. These Examples are intended to be illustrative only and are not intended to limit the scope of the present invention. Also, parts and percentages are by weight unless otherwise indicated.

EXAMPLES

Preparation of Sulfonated Polyesters

Moderately sulfonated polyesters prepared by polycondensation were selected with a sufficient enough loading of sulfonate groups to afford rapid dissipation of the polyester polymer in warm water (5° C. to 10° C.>Tg of the polyester) to permit formation of submicron particles.

Preparation of Linear Moderately Sulfonated Polyester (SPE)

A linear sulfonated random copolyester resin comprised of, on a mol percent, approximately 0.465 of terephthalate, 0.035 of sodium sulfoisophthalate, 0.475 of 1,2-propanediol, and 0.025 of diethylene glycol was prepared as follows. In a one liter Parr reactor equipped with a bottom drain valve, double turbine agitator, and distillation receiver with a cold water condenser were charged 388 grams of dimethylterephthalate, 44.55 grams of sodium dimethylsulfoisophthalate, 310.94 grams of 1,2-propanediol (1 mole excess of glycol), 22.36 grams of diethylene glycol (1 mole excess of glycol), and 0.8 gram of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over, a one hour period, after which the pressure was slowly reduced from atmospheric pressure to about 260 Torr over a one hour period, and then reduced to 5 Torr over a two hour period with the collection of approximately 122 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the 3.5 mol percent sutlfonated-polyester resin, copoly(1,2-propylene-diethylene)terephthalate-copoly (sodium sulfoisophthalate dicarboxylate). The sulfonated-polyester resin glass transition temperature was measured to be 59.5° C. (onset) utilizing the 910 Differential Scanning Calorimeter available from E.I. DuPont operating at a heating rate of 10° C. per minute. The number average molecular weight was measured to be 3,250 grams per mole, and the weight average molecular weight was measured to be 5,290 grams per mole using tetrahydrofuran as the solvent. A particle size of 57 nanometers (volume weighted) was measured using a Nicomp particle sizer.

Preparation of Latex Stock Solutions

Submicron dispersions of the appropriate sulfonated polyester, and more specifically, the above prepared polyester, in distilled deionized water were prepared by first heating the water present to about 10° C. to about 15° C. (degrees Centigrade throughout) above the glass transition of the sulfonated polyester polymer and then slowly adding the polyester with stirring until it had been fully dispersed. The latex had a characteristic blue tinge and particle sizes of from about 5 to about 100 nanometers. Stock solutions were stable indefinitely. In general, 50 grams of the above prepared sulfonated polyester were dissipated in 200 grams of water resulting in a sulfonated polyester dispersion. The dispersion was then further diluted with deionized water for the preparation of toner in the following Examples.

Example I

Preparation of a 15 Percent PTFE Cyan Toner

851 Grams of the above prepared sulfonated polyester dispersion with a 12 percent solids content were mixed with 10.8 grams of a cyan pigment dispersion (FLEXIVERSE PB 15:3™, 47.3 percent by weight pigment in water) and 40.8 grams of 80 nanometer size PTFE solution (THV 350C) having a PTFE copolymer composition of tetrafluoroethylene, hexafluoropropylene, and vinylidene fluoride with a solids content of 47 percent, the remaining components being water and a dispersant. The mixture was then heated to about 58° C. in a heating mantle with constant stirring (160 to 170 rpm) and to this were added 14 grams of $Zn(OCOCH_3)_2.2H_2O$ in about 266 milliliters of water. Stirring was then continued for 8 hours, resulting in cyan toner particles with an average particle size of about 5.1 microns and GSD of 1.20 each as measured by the Coulter Counter. The cyan toner was comprised of about 81 weight percent of resin, 15 weight percent of PTFE and 4 weight percent of cyan pigment 15.3.

Unfused images were produced at 1 $mg/cm^2$, Toner Mass per unit Area (TMA) on a color Xpressions, 90 grams per square meter (gsm) paper, using a modified MITA copier. All samples were fused on a universal fixture comprising a fuser roll having an outer layer of 20 microns of VITON 1198™ and a bottom layer with 3 millimeters of LSR DOW Coming 6395 silicone oil on a 4 inch diameter core. The nip dwell time was adjusted to 30 milliseconds, and the pressure roll temperature was retained at approximately 9° C. The silicone oil rate was 11.3 milligrams/copy. A decrease on gloss of 15 ggu (58 ggu) while an increase in +7° C. (151° C.) minimum fix temperature (MFT) was observed. The fusing results were then compared to the comparative toner Example I which contained no PTFE.

Example II

Preparation of a 9 Percent PTFE Magenta Toner

832 Grams of the above prepared sulfonated polyester resin dispersion with a 12 percent solids content was mixed with 19.2 grams of the magenta pigment dispersion, FLEXIVERSE PR 81:3™, 39.5 percent by weight of pigment in water, and 40.8 grams of colloidal PTFE solution (THV 350C) with a solids content of 47 percent (percent by weight). The mixture was then heated to about 58° C. in a heating mantle with constant stirring (160 to 170 rpm) and to this were added 14 grams of $Zn(OCOCH_3)_2.2H_2O$ in about 266 milliliters of water. Stirring was then continued for 8 hours, resulting in magenta toner particles with an average particle size of about 5.5 microns and GSD of 1.20 each as measured by the Coulter Counter. The magenta toner was comprised of about 79 weight percent of resin, 15 weight percent of PTFE and 6 weight percent of the magenta pigment FLEXIVERSE PR 81:3™.

Unfused images were produced at 1 milligram/$cm^2$, Toner Mass per unit Area (TMA) on a color Xpressions, 90 gsm paper using a modified MITA copier. All samples were fused on a universal fixture comprising a fuser roll having an outer layer of 20 microns of VITON 1198™ and a bottom layer with 3 millimeters of LSR DOW Coming 6395 silicone oil on a 4 inch diameter core. The nip dwell time was adjusted to 30 ms and the pressure roll temperature was kept at approximately 97° C. The silicone oil rate applied was 11.3 milligrams/copy. A decrease in gloss of 20 ggu (53 ggu) and an increase in +8° C. (152° C.) minimum fix temperature (MFT) was observed. The fusing results were then compared to the comparative toner Example I which contained no PTFE.

Example III

Preparation of a 9 Percent PTFE Yellow Toner

822 Grams of the above generated sulfonated polyester resin dispersion with a 12 percent solids content were mixed with 22.7 grams of a yellow pigment dispersion (FLEXIVERSE Yellow 17™, 39 percent by weight pigment in water) and 40.8 grams of colloidal PTFE solution (THV 350C) having a solids content of 47 percent. The mixture was then heated to about 58° C. in a heating mantle with constant stirring (160 to 170 rpm) and to this were added 14 grams of the complexing component $Zn(OCOCH_3)_2.2H_2O$ in about 266 milliliters of water. Stirring was then continued for 8 hours, resulting in yellow toner particles with an average particle size of about 5.5 microns and GSD of 1.19, both as measured by the Coulter Counter. The yellow toner was comprised of about 78 weight percent of resin, 15 weight percent of PTFE and 7 weight percent of yellow pigment FLEXIVERSE Yellow 17™.

Unfused images were produced at 1 milligram/$cm^2$, Toner Mass per unit Area (TMA) on a color Xpressions, 90 gsm paper using a modified MITA copier. All samples were fused on a universal fixture comprised of fuser roll having an outer layer of 20 microns of VITON 1198™ and a bottom layer with 3 millimeters of LSR DOW Coming 6395 silicone oil on a 4 inch diameter core. The nip dwell time was adjusted to 30 ms and the pressure roll temperature was kept at approximately 97° C. The silicone oil rate applied was 11.3 milligrams/copy. A decrease in gloss of 22 ggu (51 ggu) and an increase in +10° C. (154° C.) minimum fix temperature (MFT) was observed.

Example IV

Preparation of a 15 Percent PTFE Black Toner

832 Grams of the above prepared sulfonated polyester resin dispersion with a 12 percent solids content were mixed with 16.1 grams of a black pigment dispersion (REGAL 660®, 47 percent by weight pigment in water) and 27.2 grams of colloidal PTFE solution (THV 350C) having a solids content of 47 percent. The mixture was then heated to about 58° C. in a heating mantle with constant stirring (160 to 170 rpm) and to this were added 14 grams of $Zn(OCOCH_3)_2.2H_2O$ in about 266 milliliters of water. Stirring was then continued for 8 hours, resulting in black toner particles with an average particle size of about 5.5 microns and GSD of 1.19 as measured by the Coulter Counter. The black toner was comprised of about 79 weight percent of resin, 15 weight percent of PTFE and 6 weight percent of the black pigment REGAL 660®.

Unfused images were produced at 1 milligram/$cm^2$, Toner Mass per unit Area (TMA) on a color Xpressions, 90 gsm paper using a modified MITA copier. All samples were fused on a universal fixture comprised of fuser roll having an outer layer of 20 microns of VITON 1198™ and a bottom layer with 3 millimeters of LSR DOW Coming 6395 silicone oil on a 4 inch diameter core. The nip dwell time was adjusted to 30 ms and the pressure roll temperature was kept at approximately 97° C. The silicone oil rate applied was 11.3 milligrams/copy. A decrease in gloss of 19 ggu (54 ggu) and an increase in +9° C. (153° C.) minimum fix temperature (MFT) was observed.

Comparative Example

Non-PTFE Containing Toner 1,011 Grams of the above prepared sulfonated polyester resin dispersion with a 12 percent solids content were mixed with 10.8 grams of a cyan pigment dispersion (FLEXIVERSE PB 15:3™, 47.3 percent by weight pigment in water). The mixture was then heated to about 58° C. in a heating mantle with constant stirring (160 to 170 rpm) and to this were added 14 grams of $Zn(OCOCH_3)_2 \cdot 2H_2O$ in about 266 milliliters of water. Stirring was then continued for 8 hours, resulting in cyan toner particles with an average particle size of about 5.1 microns and a GSD of 1.20, both as measured by the Coulter Counter. The cyan toner was comprised of about 96 weight percent of resin, and 4 weight percent of cyan pigment 15.3.

Unfused images were produced at 1 milligram/cm$^2$, Toner Mass per unit Area (TMA) on a color Xpressions, 90 gsm paper using a modified MITA copier. All samples were fused on a universal fixture comprised of fuser roll having an outer layer of 20 microns of VITON 1198™ and a bottom layer with 3 millimeters of LSR Dow Coming 6395 silicone oil on a 4 inch diameter core. The nip dwell time was adjusted to 30 ms and the pressure roll temperature was retained at approximately 97° C. The silicone oil rate applied was 11.3 milligrams/copy. The fusing results indicated that the toner had an MFT of 144° C. and a peak gloss of 73 ggu.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A process comprising heating a latex, a colorant dispersion, a polytetrafluoroethylene dispersion, and an organ o metallic complexing component.

2. A process in accordance with claim 1 wherein the latex contains a sulfonated polyester, and wherein said heating is below about the glass transition temperature of said polyester, followed by heating above about the glass transition temperature of said polyester.

3. A process in accordance with claim 2 wherein said polyester is a sodio sulfonated polyester.

4. A process in accordance with claim 1 wherein said latex which contains a sulfonated polyester and water is generated by heating, subsequently adding thereto said colorant dispersion and said polytetrafluoroethylene dispersion, followed by the addition of said organo metallic complexing component, and thereafter heating, and wherein there results a toner product.

5. A process in accordance with claim 1 wherein said latex is (i) comprised of sodio sulfonated polyester resin particles of a size diameter of from about 5 to about 300 nanometers, which resin particles are present in an amount of from about 5 to about 40 weight percent, and wherein said latex is prepared by heating said resin particles in water at a temperature of from about 45° C. to about 80° C.;

(ii) thereafter adding said colorant dispersion containing from about 20 to about 50 percent of predispersed colorant in water, and wherein the mean colorant diameter size is from about 50 to about 150 nanometers, and adding said polytetrafluoroethylene (PTFE) dispersion containing from about 20 to about 50 percent of a predispersed polytetrafluoroethylene copolymer in water with a mean particle size for said copolymer of from about 30 to about 150 nanometers and shearing, followed by the addition of said organo metallic complexing component in an amount of from about 1 to about 10 weight percent in water;

(iii) heating the resulting mixture at a temperature of from about 35° C. to about 65° C. thereby causing aggregation and coalescence resulting in toner particles of from about 3 to about 20 microns in diameter; and (iv) subsequent to cooling isolating a toner product.

6. A process in accordance with claim 5 wherein the particle size distribution of the aggregated particles is about 1.40 decreasing to about 1.15, when the temperature is increased from room temperature, about 25° C. to about 55° C.

7. A process in accordance with claim 5 wherein said shearing is accomplished by homogenizing at from about 1,000 revolutions per minute to about 10,000 revolutions per minute, at a temperature of from about 25° C. to about 35° C. for an optional duration of from about 1 minute to about 120 minutes.

8. A process in accordance with claim 5 wherein the polyester of (i) is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylene sodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate).

9. A process in accordance with claim 5 wherein the toner obtained after cooling is from about 3 to about 15 microns in volume average diameter, and the geometric size distribution thereof is from about 1.15 to about 1.25.

10. A process in accordance with claim 5 wherein prior to cooling (iv) there is accomplished heating of from about 35° C. to about 65° C. above the polyester resin Tg.

11. A process in accordance with claim 5 wherein said colorant is a pigment, said resin is copoly(1,2-propylene-diethylene) terephthalate-copoly(sodium sulfoisophthalate dicarboxylate), said polytetrafluoroethylene is present as a dispersion, and said complexing component is $Zn(OCOCH_3)_2 \cdot 2H_2O$.

12. A process in accordance with claim 5 wherein said complexing component is metal salts of acetate where the metal is zinc, lithium, calcium, barium, copper(II), chromium(II), strontium, vanadium, manganese(II), iron(II), silver or sodium.

13. A process in accordance with claim 1 wherein the organo metallic complexing component is selected from the group consisting of metal salts of acetate where the metal is zinc, lithium, calcium, barium, copper(II), chromium(II), strontium, vanadium, manganese(II), iron(II), silver or sodium; the salt derivatives of 2,4-pentanedione of zinc acetylacetonate hydrate, lithium acetylacetonate, calcium acetylacetonate hydrate, barium acetylacetonate hydrate, copper(II) acetylacetonate, chromium(II) acetylacetonate, strontium acetylacetonate, vanadium(II) acetylacetonate, manganese(II and III) acetylacetonate, iron(III) acetylacetonate, silver acetylacetonate or sodium acetylacetonate; metal salts of benzoate where the metal is lithium, silver or sodium, and a metal formate wherein the metal is copper(II) or sodium.

14. A process in accordance with claim 1 wherein the organo metallic complex is selected in an amount of from about 1 to about 10 weight percent by weight based on the weight of said resin and said colorant.

15. A process in accordance with claim 1 wherein said polytetrafluoroethylene is a copolymer of size diameter of about 30 to about 150 nanometers.

16. A process in accordance with claim 1 wherein said polytetrafluoroethylene is generated from the reaction of tetrafluoroethylene, hexafluoropropylene and vinylidene fluoride.

17. A process in accordance with claim 1 wherein said polytetrafluoroethylene is generated from the reaction of tetrafluoroethylene, hexafluoropropylene and vinylidene fluoride in an amount of from about 30 to about 70 weight percent of tetrafluoroethylene, about 10 to about 30 weight percent of hexafluoropropylene and about 10 to about 50 weight percent of vinylidene fluoride, and wherein the total of said three components is about 100 percent.

18. A process in accordance with claim 1 wherein said polytetrafluoroethylene is selected in an amount of from about 1 to about 20 percent by weight.

19. A process in accordance with claim 1 wherein the colorant is carbon black, magnetite, cyan, yellow, magenta, or mixtures thereof.

20. A process in accordance with claim 1 wherein there results toner particles of from about 2 to about 15 microns in volume average diameter, and the geometric size distribution thereof is from about 1.15 to about 1.35.

21. A process in accordance with claim 20 wherein there is added to the surface of the formed toner metal salts, metal salts of fatty acids, silicas, metal oxides, or mixtures thereof, each in an amount of from about 0.1 to about 10 weight percent of the obtained toner.

22. A process in accordance with claim 1 wherein said colorant is a pigment, said resin is copoly(1,2-propylenediethylene) terephthalate-copoly(sodium sulfoisophthalate dicarboxylate), said polytetrafluoroethylene is present as a dispersion, and said complexing component is $Zn(OCOCH_3)_2 \cdot 2H_2O$.

23. A process in accordance with claim 1 wherein said colorant is a pigment of carbon black, magenta, yellow, cyan, or mixtures thereof.

24. A substantially surfactant free process for the preparation of toner comprising admixing an emulsion latex comprised of sodio sulfonated polyester resin particles of about 30 to about 80 nanometers in size by heating said resin in water at a temperature of from about 15° C. to about 30° C. above the resin glass transition temperature; with a colorant dispersion containing from about 20 to about 50 percent of predispersed colorant in water, with a mean colorant size of from about 50 to about 150 nanometers, a polytetrafluoroethylene dispersion containing from about 30 to about 50 percent of solids comprising tetrafluoroethylene, hexafluoropropylene and vinylidene fluoride in an amount of from about 30 to about 70 weight percent of tetrafluoroethylene, about 10 to about 30 weight percent of hexafluoropropylene, and about 10 to about 50 weight percent of vinylidene fluoride in water and with a mean particle size of about 50 to about 120 nanometers, followed by the addition of an organo metallic complexing agent; heating the resulting mixture at a temperature of from about 35° C. to about 65° C. thereby causing aggregation and coalescence of the latex resin, the colorant and the polytetrafluoroethylene; and (v) cooling the mixture followed by isolating said toner.

25. A process in accordance with claim 24 wherein isolation is by filtration and cooling is to about 25° C.

26. A surfactant free process for the preparation of toner comprising mixing an emulsion latex comprised of sodio sulfonated polyester resin particles, colorant, and polytetrafluoroethylene, followed by the addition of an organo metallic complexing agent, and heating the resulting mixture causing aggregation and enabling coalescence of the latex resin, the colorant and the polytetrafluoroethylene.

27. A process in accordance with claim 26 comprising
(i) admixing said emulsion latex comprised of sodio sulfonated polyester resin particles with said colorant;
(ii) adding said polytetrafluoroethylene to said emulsion, followed by the addition of said organo metallic complexing agent;
(iii) heating the resulting mixture at a temperature of from about 35° C. to about 65° C. thereby causing aggregation and coalescence of said latex resin, said colorant and said polytetrafluoroethylene, cooling the product mixture, followed by isolation of said toner.

28. A process in accordance with claim 27 wherein there is accomplished
(i) admixing said emulsion latex comprised of said sodio sulfonated polyester resin particles of a size diameter of from about 10 to about 250 nanometers and in an amount of from about 5 to about 40 weight percent, and heating said resin particles in water at a temperature of from about 45° C. to about 80° C.;
(ii) adding said colorant containing about 20 to about 50 percent of colorant in water, which colorant possesses a mean size diameter of from about 50 to about 150 nanometers, adding said PTFE dispersion containing about 20 to about 50 percent of predispersed PTFE copolymer in water, which PTFE possesses a mean particle size of about 30 to about 150 nanometers, to said latex mixture with shearing, followed by the addition of said organo metallic complexing agent in an amount of from about 1 to about 10 weight percent in water;
(iii) heating the resulting mixture at a temperature of from about 45° C. to about 60° C. causing aggregation and coalescence resulting in toner particles of from about 4 to about 18 microns in size; and optionally
(iv) cooling the toner product mixture to about 25° C., followed by filtering and drying.

* * * * *